(12) United States Patent
Michael

(10) Patent No.: US 7,404,580 B2
(45) Date of Patent: Jul. 29, 2008

(54) HOLLOW STRUCTURE FORMED BY ROTATIONAL MOLDING AND METHOD OF MANUFACTURING SAME

(76) Inventor: William J. Michael, 3649 North Rd., 1 West, Chino Valley, AZ (US) 86323

( * ) Notice: Subject to any disclaimer, the term of this patent is extended or adjusted under 35 U.S.C. 154(b) by 395 days.

(21) Appl. No.: 11/125,594

(22) Filed: May 9, 2005

(65) Prior Publication Data

US 2006/0249947 A1 Nov. 9, 2006

(51) Int. Cl.
B60P 3/22 (2006.01)
(52) U.S. Cl. ............... 280/837; 280/838; 220/562; 220/586
(58) Field of Classification Search ......... 280/837, 280/831, 838, 839, 830; 220/630, 565, 636, 220/563, 562, 586; 137/574, 576
See application file for complete search history.

(56) References Cited

U.S. PATENT DOCUMENTS

| | | | |
|---|---|---|---|
| 3,912,103 A * | 10/1975 | Gerhard | 220/562 |
| 4,143,193 A | 3/1979 | Rees | |
| 4,147,269 A | 4/1979 | Werts | |
| 4,254,885 A | 3/1981 | Fouss et al. | |
| 4,611,724 A * | 9/1986 | Watkins et al. | 220/562 |
| 5,749,485 A * | 5/1998 | Chiu | 206/586 |
| 5,779,092 A * | 7/1998 | Hehn et al. | 220/563 |
| 5,782,493 A * | 7/1998 | Bolton et al. | 280/837 |
| 5,848,720 A * | 12/1998 | Logan | 220/563 |
| 6,062,417 A | 5/2000 | Evans | |
| 6,367,648 B1 | 4/2002 | Boone, Jr. et al. | |
| 6,484,899 B1 | 11/2002 | Garton | |
| 6,547,091 B2 * | 4/2003 | Hagenbuch | 220/563 |
| 6,564,961 B1 * | 5/2003 | Klein | 220/563 |
| 6,619,310 B2 | 9/2003 | Evanovich et al. | |
| 6,634,700 B1 | 10/2003 | Calvert | |
| 6,637,457 B2 | 10/2003 | Evanovich et al. | |
| 7,028,382 B2 * | 4/2006 | Fisher et al. | 29/455.1 |

OTHER PUBLICATIONS

Print of Tank Apparatus offered for sale in or before 2003.
Wytkin, "Composite Mold Upgrades Rotomolding Process Control," Modern Plastics, Jan. 1998, pp. 103-107.
"Rotational Molding -The Basic Process-," Association of Rotational Molders, 1995.

* cited by examiner

Primary Examiner—Hau V Phan
(74) Attorney, Agent, or Firm—Jordan M. Meschkow; Lowell W. Gresham; Charlene R. Jacobson

(57) ABSTRACT

A hollow walled structure (22) includes a shell (36) having a wall defining an interior compartment (46). A first support, in the form of a baffle (48), is disposed within the interior compartment (46) and engages the shell (36) at two locations (52, 54). A second support, in the form of a post (83), engages the shell (36) and extends through the interior compartment (46) to intersect the baffle (48). The shell (36), baffle (48), and post (83) are formed concurrently from a thermoplastic material by a rotational molding process. The rotational molding process can entail operations of pre-heating interior portions of the mold, delivering heat to the interior portions of the mold, and/or filling the mold with excess thermoplastic material prior to preheating the mold. The rotationally molded structure (22) has sufficient strength to function as a tank for carrying a liquid (34) in a liquid transport apparatus (20).

24 Claims, 9 Drawing Sheets

HOLLOW STRUCTURE FORMED BY ROTATIONAL MOLDING AND METHOD OF MANUFACTURING SAME

TECHNICAL FIELD OF THE INVENTION

The present invention relates to hollow walled structures formed by rotational molding, and a method of making such hollow walled structures. More specifically, the present invention relates to a rotationally molded tank for a liquid transport apparatus.

BACKGROUND OF THE INVENTION

Plastic parts have the advantage of light weight, corrosion resistance and lower cost. One method for manufacturing some plastic parts is known as rotational molding, or rotomolding. Rotational molding is a process in which a hollow mold is loaded with a pre-measured plastic resin, and the mold is heated as it is slowly rotated bi-axially. The simultaneous heating and rotation causes the melting resin to generally coat the entire inner surface of the mold and fuse. The mold is then cooled and the plastic part is removed from the mold.

Rotational molding results in seamless parts with generally uniform wall thickness and more material in corners to absorb shocks and stresses where they occur most. Rotational molding also offers superb design flexibility and precision. Complex contours, metal inserts, flanges, and molded-in threads can be designed into the walls thus requiring fewer steps to produce the finished product. Since they are typically lighter in weight than metal or fiberglass, rotationally molded finished products are easy to handle and less expensive to ship. In addition, the molds don't need to be designed to withstand the high pressures of injection molding, nor do the molds have an internal core to manufacture. Accordingly, tool costs for the molds are lower relative to other plastic molding techniques, and minor changes can be readily incorporated into existing molds.

Relatively large hollow walled articles, such as tanks for carrying liquids, have been integrally molded utilizing rotational molding processes. Indeed, rotational molding is a cost-effective way to produce such large hollow walled tanks. Although rotationally molded products are recognized for their strength and durability, rotationally molded tanks utilized for liquid transport and storage suffer from a number of problems.

For example, the force exerted on the inner surface of the tank by the liquid can adversely affect the structural integrity of the tank. That is, the tank may bulge outwardly in response to the force and may fail causing the tank to burst. This problem is exacerbated when the tank is large. For example, with a weight of over eight pounds per gallon for water, the overall weight of a load of water in a tank having a storage capacity of as little as two hundred gallons of water can exceed sixteen hundred pounds.

Another problem that arises is that the liquid within the tank acquires momentum as it is transported by a vehicle. As the vehicle accelerates or decelerates, the inertia of the liquid causes it to slosh against the front end or the rear end of the tank. The forces associated with this sloshing further stresses the structural integrity of the tank. More critically, the forces associated with this sloshing can have a destabilizing effect on the vehicle. Such destabilization may cause the driver to lose control of the vehicle, or may cause the vehicle, or a trailer carrying the tank, to overturn.

It is known to place fixed baffles in a tank that extend at right angles to the direction of anticipated movement of liquids contained within the tank. The intent of such baffles is to break the total water volume into smaller volumes thus limiting the distance that the liquid can slosh within the tank. Other prior art systems utilize a floating baffle system of individual spherical objects, each of which floats in the liquid and absorbs the kinetic energy present within the liquid by collision of those objects among themselves.

While both types of baffle systems may be helpful for limiting the movement of the liquid within the tank, they are typically formed from numerous parts that are installed into the tank following manufacturing of the tank itself. The numerous elements and post-manufacturing installation drive up the overall cost and complexity of the tank. In addition, such baffles do not typically strengthen the tank in order to withstand the forces imposed on the tank walls by the liquid.

Accordingly, what is needed is a cost-effectively manufactured hollow walled structure that may be utilized to store and/or transport liquid or solid materials. What is further needed is a tank that can withstand forces imposed on it by the material, as well as provide baffling, so as to limit movement of a liquid within the tank.

SUMMARY OF THE INVENTION

Accordingly, it is an advantage of the present invention that a hollow walled structure is provided.

It is another advantage of the present invention that a hollow walled structure is provided that can withstand forces imposed on it by a material carried within the structure.

Another advantage of the present invention is that a hollow, walled structure is provided with baffles so as to limit movement of a liquid carried within the structure.

Yet another advantage of the present invention is that a hollow walled structure is simply and cost-effectively manufactured utilizing a rotational molding process.

The above and other advantages of the present invention are carried out in one form by a hollow walled structure that includes a shell having a wall defining an interior compartment. A first support is disposed within the interior compartment and engages the wall at a first location and a second location. A second support engages the wall at a third location and extends through the interior compartment to intersect the first support. The shell, the first support, and the second support are formed concurrently from a thermoplastic material by a rotational molding process.

The above and other advantages of the present invention are carried out in another form by a method of rotationally molding a hollow walled structure that includes a shell having a wall that defines an interior compartment, a first support and a second support disposed within the interior compartment. The method calls for providing a first mold section shaped according to a first portion of the shell and having a first protrusion section and a second support protrusion for abutting the first protrusion section. The method further calls for providing a second mold section shaped according to a second portion of the shell and having a second protrusion section. The second mold section is assembled with the first mold section to form a closed mold having a molding surface, with the second protrusion section abutting the first protrusion section in the closed mold. Thermoplastic material is introduced into the closed mold, and the mold is heated and rotated about at least two axes to melt and distribute the thermoplastic material about the molding surface. The mold is cooled, and the structure is removed from the mold. The structure includes the first and second supports disposed in the interior compartment, the first support being formed in response to distribution of the thermoplastic material on the first and second protrusion sections, and the second support being formed in response to distribution of the thermoplastic material on the second support protrusion.

The above and other advantages of the present invention are carried out in yet another form by a liquid transport apparatus that includes a rotationally molded tank, a frame supporting the tank, and wheels rotationally coupled to the frame. The tank includes a shell having a wall defining an interior compartment. A first support is disposed within the interior compartment and engages the wall at a first location and a second location, and a second support engages the wall at a third location and extends through the interior compartment to intersect the first support.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
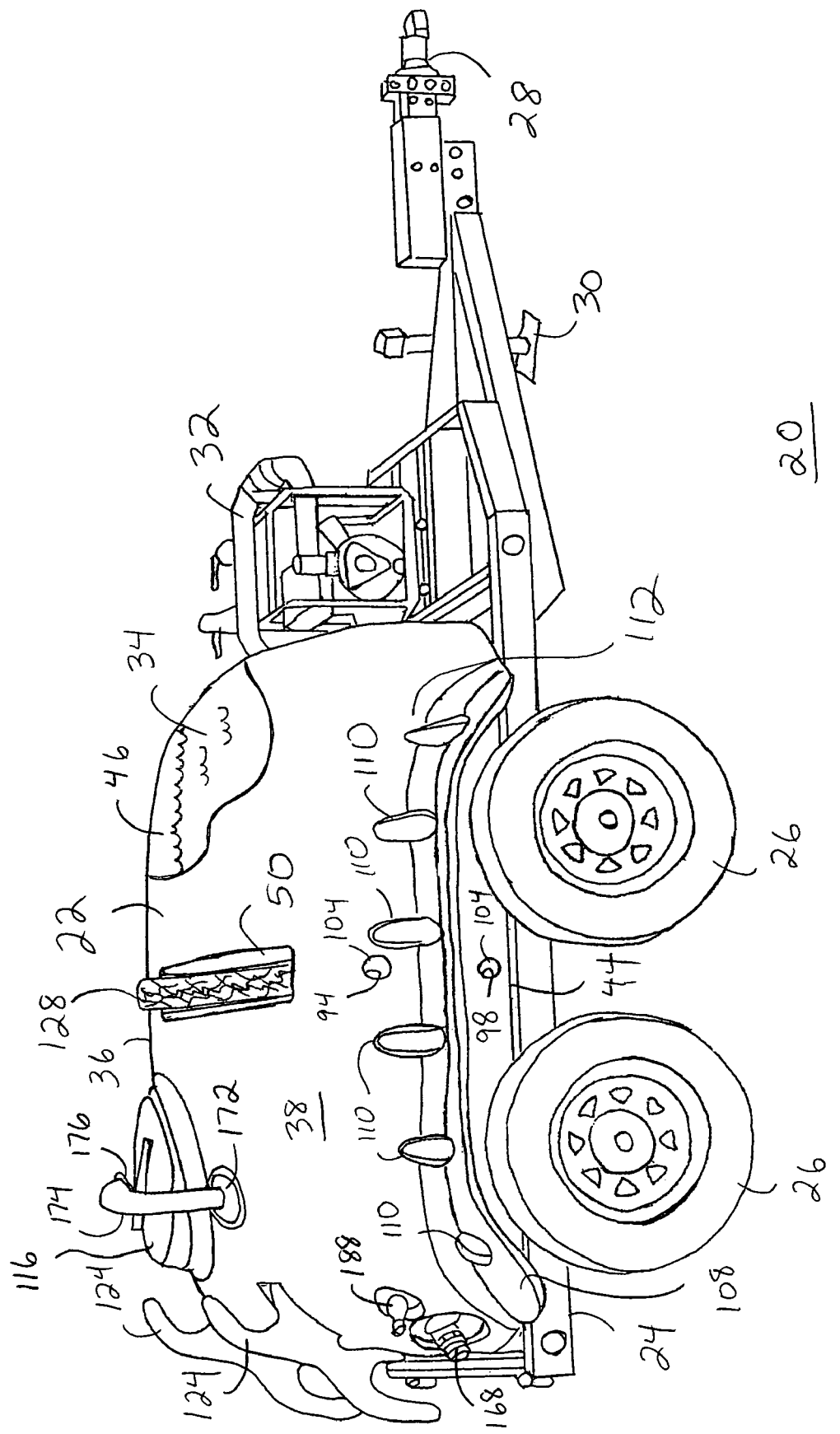
FIG. 1 shows a side view of a liquid transport apparatus including a hollow walled tank in accordance with a preferred embodiment of the present invention.

FIG. 1 shows a side view of a liquid transport apparatus 20 including a hollow walled tank 22 in accordance with a preferred embodiment of the present invention. Apparatus 20 generally includes tank 22, a frame 24 supporting tank 22, and wheels 26 rotationally coupled to frame 24. Apparatus 20 may further include a hitch mechanism 28 for attachment to a towing vehicle (not shown), a jack stand 30 for retaining apparatus 20 approximately horizontal when apparatus 20 is not being towed, and a pump system 32 for pressurized delivery of a liquid 34, such as water, stored in tank 22. Thus, frame 24, wheels 26, and hitch mechanism 28 form a wheeled trailer to which tank 22 is attached for transport.

Tank 22 is a hollow walled structure formed from thermoplastic material, such as, polyethylene, polypropylene, acrylonitrile butadiene styrene (ABS), polyvinyl chloride (PVC), nylon, and the like. Tank 22 is manufactured utilizing a rotational molding process. A rotational molding technique and a thermoplastic material are highly desirable for making a hollow walled structure, such as tank 22, due to cost effective production, as well as, high durability, corrosion resistance, and light weight of the finished product.

The design of tank 22 and the manufacturing techniques employed to produce tank 22 enable tank 22 to have a large material storage capacity. In a preferred embodiment, tank 22 has a liquid storage capacity of at least two hundred gallons. Although tank 22 is shown mounted on frame 24, it will become apparent that tank 22 need not be mounted on frame 24, but may instead be loaded into the bed of a truck, mounted on truck frame rails, or mounted on a stationary stand at a fixed location.

Figure 2:
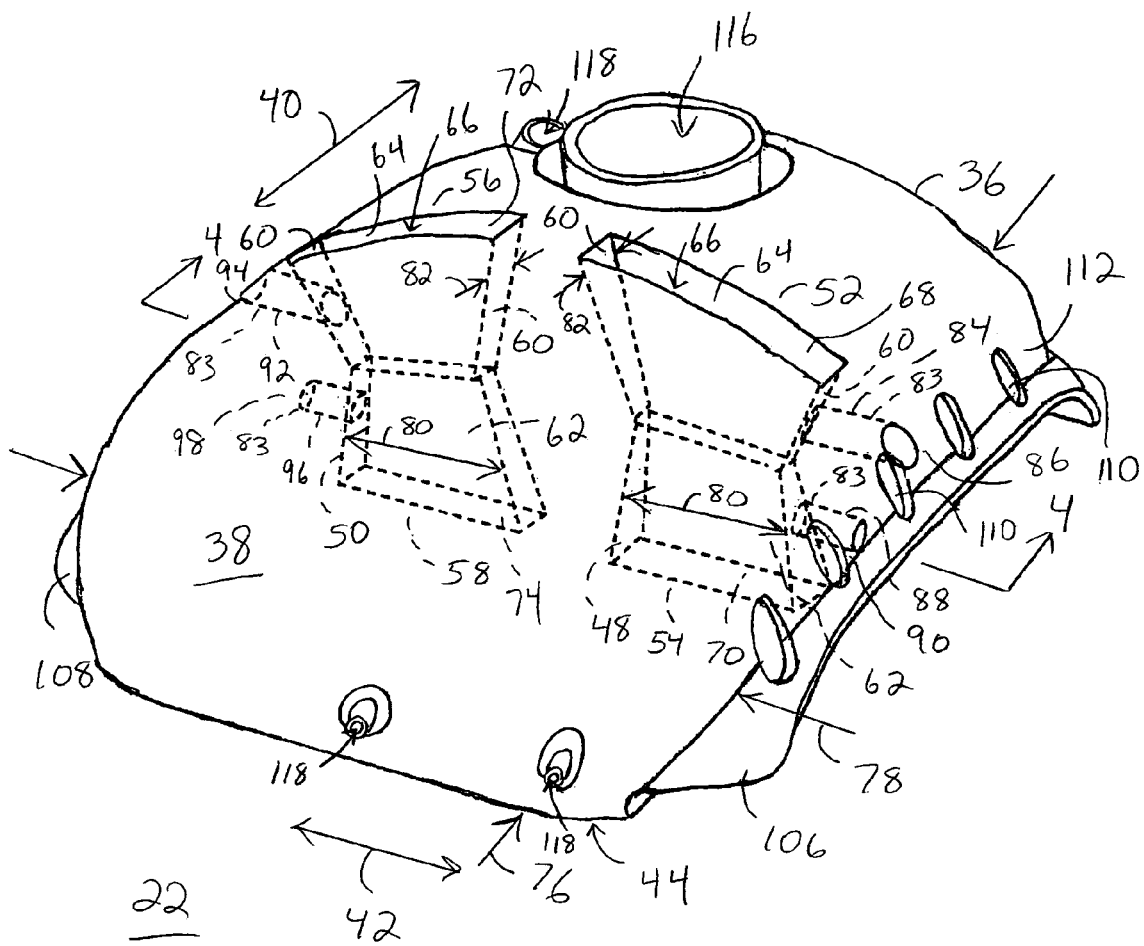
FIG. 2 shows a perspective view of the tank of the liquid transport apparatus.
Figure 3:
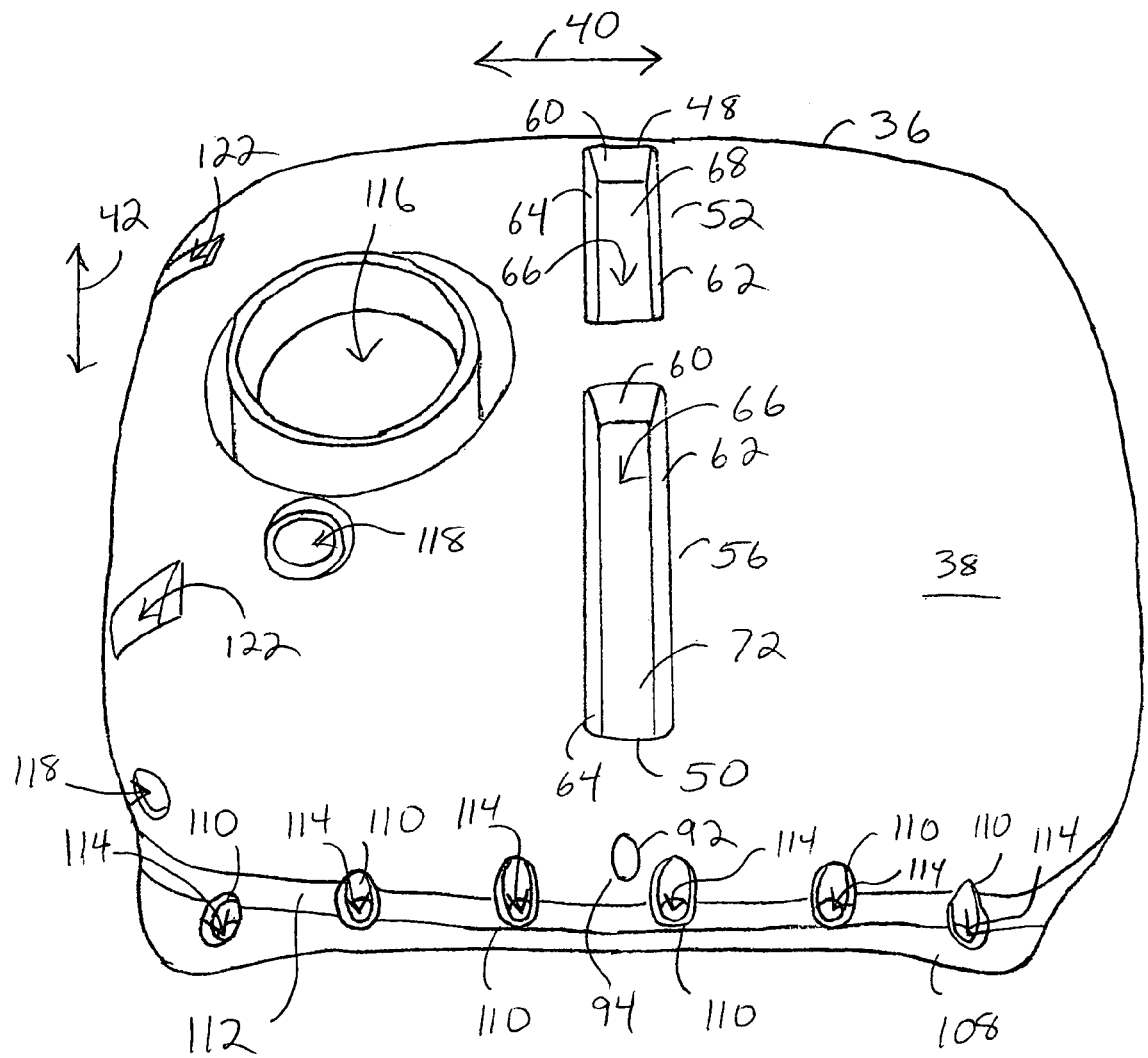
FIG. 3 shows a top perspective view of the tank of FIG. 2.
Figure 4:
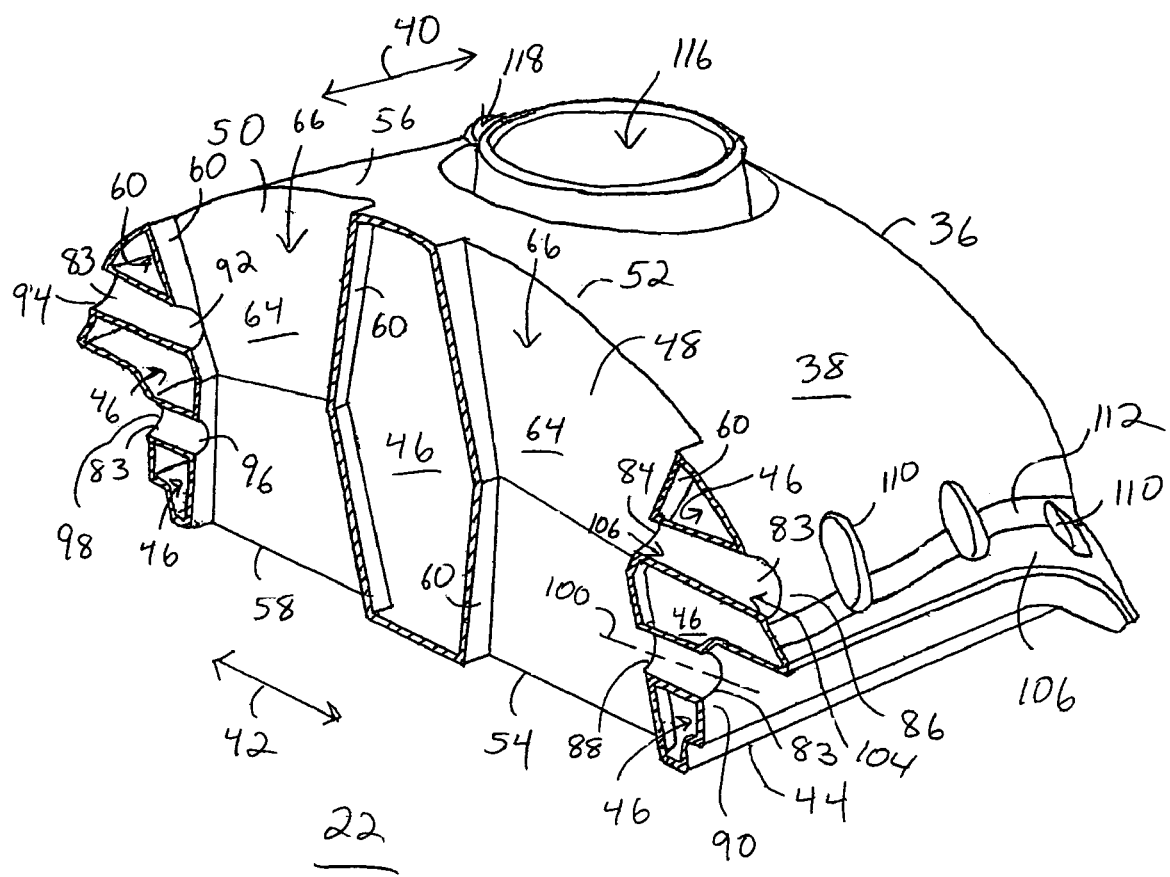
FIG. 4 shows a sectional perspective view of the tank along section lines 4-4 of FIG. 2.

Referring to FIGS. 2-4 in connection with FIG. 1, FIG. 2 shows a perspective view of tank 22 of liquid transport apparatus 20, FIG. 3 shows a top perspective view of tank 22, and FIG. 4 shows a sectional perspective view of tank along section lines 4-4 of FIG. 2.

Tank 22 includes a shell 36 having a top wall 38 elongated in a longitudinal direction (indicated by a double arrow 40) and having a generally arced cross-section in a transverse direction (indicated by a double arrow 42) to longitudinal direction 40. Shell 36 further includes a generally flat bottom wall 44 elongated in longitudinal direction 40, and arranged to close the arced cross-section of top wall 38. Top wall 38 and bottom wall 44 close to form a continuous wall that defines an interior compartment 46 of tank 22.

The arced top wall 38 and generally flat bottom wall 44 of shell 36 results in tank 22 having a low profile and a lower center of gravity than traditionally utilized cylindrical or elliptical tanks. The low profile provides for better rear view visibility to the driver of a vehicle towing apparatus 20. Alternatively, when tank 22 is simply loaded into a truck bed, again the low profile enables better rear view visibility to the drive. In addition, the low center of gravity yields a more stable tank than prior art cylindrical or elliptical tanks. However, the present invention need not be limited to the particular shape of tank 22 illustrated herein. Rather, principles of the present invention, discussed below, may be applied to various shapes and sizes of hollow walled structures formed by rotational molding.

Supports are disposed in interior compartment 46. These supports are formed from thermoplastic material concurrently with shell 36 through rotational molding so as to preclude the need for post fabrication installation of such supports, so as to decrease the number of discrete parts and decrease labor costs. In particular, tank 22 includes substantially vertically oriented first supports, referred to herein as a first baffle 48 and a second baffle 50. First baffle 48 engages top and bottom walls 38 and 44, respectively, of shell 36 at two locations, differentiated herein as a first top location 52 and a first bottom location 54. Similarly, second baffle 50 engages top and bottom walls 38 and 44, respectively, of shell 36 at two locations, differentiated herein as a second top location 56 and a second bottom location 58. First and second baffles 48 and 50, respectively, are shown in their entirety in ghost form in FIG. 2, and are shown partially in each of FIGS. 3-4.

Each of first and second baffles 48 and 50, respectively, includes side walls 60 interconnected with a front wall 62 and a rear wall 64 to form a duct 66, or pass-through, extending entirely through interior compartment 46. Duct 66 of first baffle 48 includes a first opening 68 through top wall 38 at first top location 52 and a second opening 70 through bottom wall 44 at first bottom location 54. Likewise, duct 66 of second baffle 50 includes a first opening 72 through top wall 38 at second top location 56 and a second opening 74 through bottom wall 44 at second bottom location 58.

Referring particularly to FIG. 2, shell 36 exhibits a length 76 and a width 78 perpendicular to length 76. In a preferred embodiment, each of first and second baffles 48 and 50 exhibits a baffle width 80 that is greater than a baffle thickness 82, and each of first and second baffles 48 and 50 are oriented such that baffle width 80 is substantially parallel to width 78 of shell 36. This orientation places baffle width 80 of first and second baffles 48 and 50, respectively, at right angles to the direction of anticipated movement of liquid 34 carried within tank 22. The combined baffle widths 80 of first and second baffles 48 and 50 largely fill width 78 of shell 36 so that interior compartment 46 is subdivided into two smaller compartments, thus limiting the distance that liquid 34 can slosh within tank 22. In addition, the engagement of first and second baffles 48 and 50, respectively, with top and bottom walls 38 and 44, respectively, serves to increase the structural integrity of tank 22.

Although tank 22 is illustrated as having two baffles disposed in interior compartment 46, it should be understood that tank 22 may be adapted to include only one baffle or more than two baffles in response to the particular material to be stored and/or transported in the tank, and in response to the desired volume of the tank. For example, it may be desirable to increase the quantity of baffles for larger tanks.

Second supports, referred to collectively as posts 83 are also disposed in interior compartment 46. In the illustrated embodiment, posts 83 include a first post 84 engaging top wall 38 at a first location 86 and extending through interior compartment 46 to intersect one of side walls 60 of first baffle 48, and a second post 88 engaging bottom wall 44 at a second location 90 and extending through interior compartment 46 to intersect the same one of side walls 60 of first baffle 48. Similarly, posts 83 further include a third post 92 engaging top wall 38 at a third location 94 and extends through interior compartment 46 to intersect one of side walls 60 of second baffle 50, and a fourth post 96 engages bottom wall 44 at a fourth location 98 and extends through interior compartment 46 to intersect the same one of side walls 60 of second baffle 50.

Each of posts 83 is a tubular member having a first post opening 104 through one of top and bottom walls 38 and 44, respectively, of shell 36, and having a second post opening 106 extending through one of side walls 60 of one of first and second baffles 48 and 50, respectively. Posts 83, as well as first and second baffles 48 and 50, are tubular, or hollow, in response to the rotational molding technique performed to fabricate tank 22.

In this illustrated embodiment, longitudinal axes 100 of posts 83 (i.e., first, second, third, and fourth posts 84, 88, 92, and 96) are oriented approximately transverse to length 76 of shell 36. Posts 83 further strengthen tank 22 so that tank 22 can withstand the outwardly imposed force of liquid 34 carried by tank 22. Since tank 22 is formed from a thermoplastic material, posts 83 limit outward bulging of the sides of tank 22 that can occur in response to the force of liquid 34.

Although tank 22 is illustrated as having four posts 83 disposed in interior compartment 46, it should be understood that tank 22 may be adapted to include any number of posts 83 in response to the particular material to be stored and/or transported in such a tank, and in response to the desired volume of the tank. In addition, posts 83 need not be oriented transverse to length 76 of shell 36, but may engage front and rear sides of tank 22 and intersect either of front and rear walls 62 and 64, respectively, of first and second baffles 48 and 50, respectively.

As discussed above, tank 22 may be configured for attachment to a wheeled trailer formed from frame 24, wheels 26, and hitch mechanism 28. In this capacity, tank 22 further includes a first fender 106 and a second fender 108 extending outwardly from opposing sides of shell 36. First and second fenders 106 and 108, respectively, extend from shell 36 and substantially cover wheels 26 of the wheeled trailer.

First and second fenders 106 and 108 are formed from thermoplastic material by a rotational molding process. More specifically, first and second fenders 106 and 108 are rotationally molded concurrently with shell 36, the first supports (i.e., first and second baffles 48 and 50), and the second supports (i.e., posts 83). This concurrent fabrication technique precludes the need for post fabrication assembly of separate fenders, thus decreasing the number of discrete parts as well as labor costs. In addition, the integral first and second fenders 106 and 108 yield an aesthetically pleasing and durable product.

Tank 22 further includes generally parallel spaced indentations 110 arranged along longitudinal sides 112 of shell 36 and extending as holes 114 (best seen in FIG. 3) through first and second fenders 106 and 108, respectively. Indentions 110 are formed during the rotational molding process utilizing an appropriately shaped mold. Indentations 110 are inwardly rounded depressions into longitudinal sides 112 that form reinforcing ridges, or ribs in tank 22. Indentations 110 are particular useful for providing additional strength to tank 22 when subjected to the outward force of liquid 34 (FIG. 1).

Tank 22 may be further rotationally molded to include an opening 116 for the introduction of materials, such as liquid 34, into interior compartment 46. One or more openings 118 may additionally be provided for receiving the material, such as liquid 34, into tank 22, and removing liquid 34 from tank 22. Other exterior depressions, protuberances, and the like may be included on shell 36 commensurate with the shape of a mold utilized when rotationally molding tank 22.

By way of another example, receptacles 122 may be provided into which additional elements may be installed. As shown in FIG. 1, a pair of hose wrap elements 124 are installed on tank 22, around which hose, cords, and other flexible elongated accessories may be wrapped. Each of hose wrap elements 124 includes a hooked member (not shown) that resides in one of receptacles 122. Thus, hose wrap elements 124 are readily installed on, and removed from, tank 22.

Figure 5:
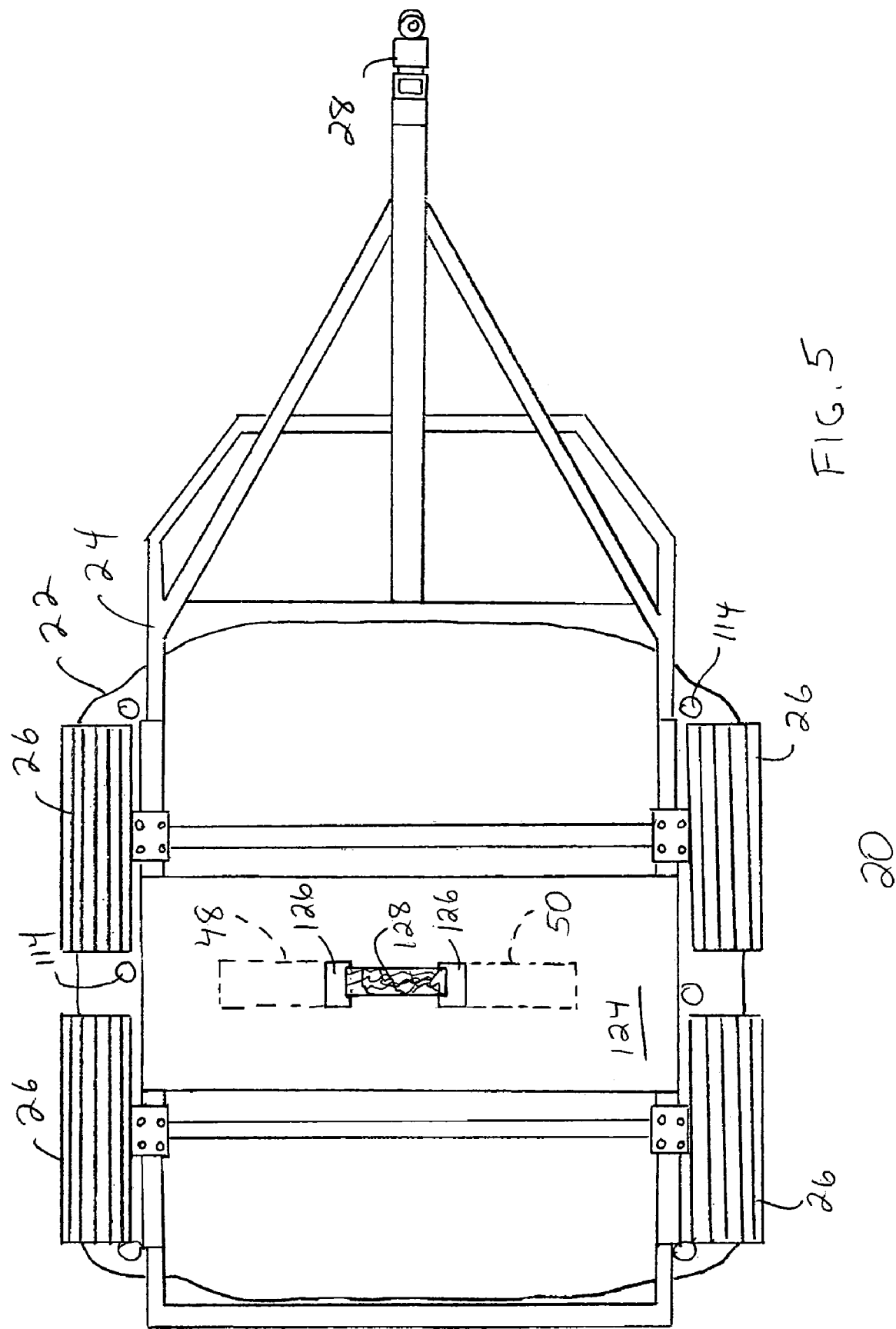
FIG. 5 shows a bottom view of the liquid transport apparatus of FIG. 1.

Referring to FIG. 5 in connection with FIG. 1, FIG. 5 shows a bottom view of liquid transport apparatus 20. In a simplified embodiment, a platform 124 is mounted to opposing sides of frame 24. A pair of openings 126 extends through platform 124. Tank 22 is seated on platform 124. Fastening means, in the form of a flexible strap member 128 is routed through duct 66 of first baffle 48 then through an aligned one of openings 126 in platform 124. Strap member 128 extends below platform 124 where it is routed through the other of openings 126 and into duct 66 of second baffle 50. Strap member 128 is subsequently fastened to its opposite end on top of tank 22 to form a continuous loop that simply and readily retains tank 22 onto platform 124.

Accordingly, first and second baffles 48 and 50, respectively, are further utilized as sites through which a tie-down member, i.e., strap 128, can be routed so as to fasten tank 22 to the wheeled trailer. However, those skilled in the art will recognize that there are various alternative ways in which strap 128 can be utilized to hold tank 22 onto platform 124.

Figure 6:
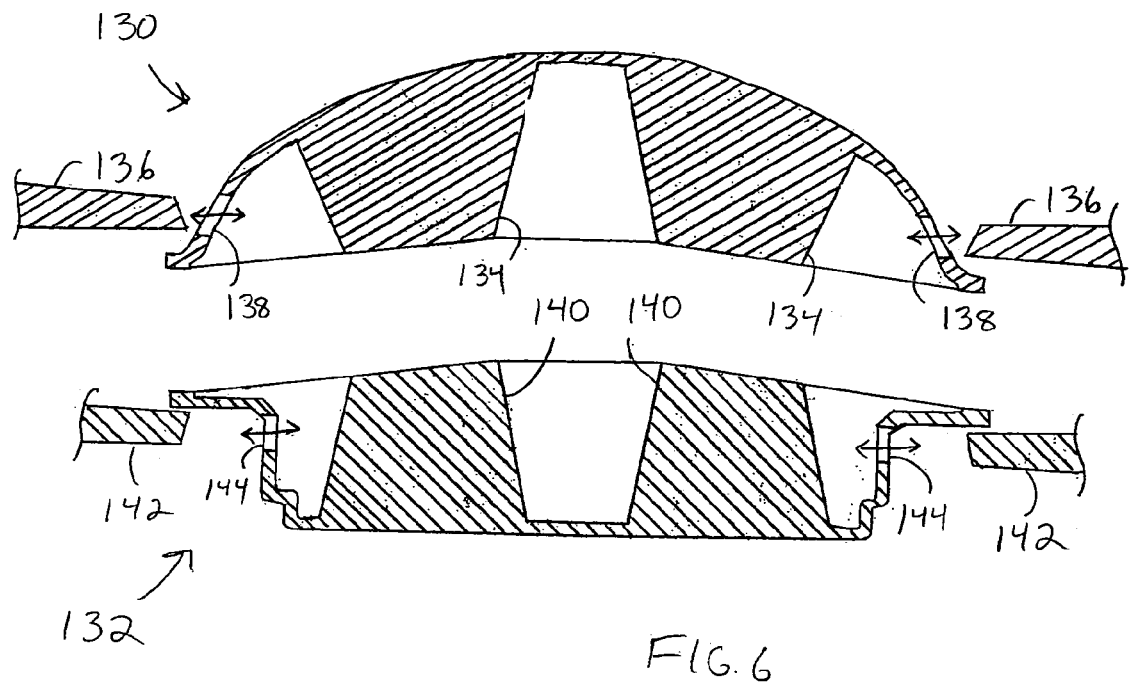
FIG. 6 shows a section view of first and second mold sections used in forming the tank of FIG. 2.
Figure 7:
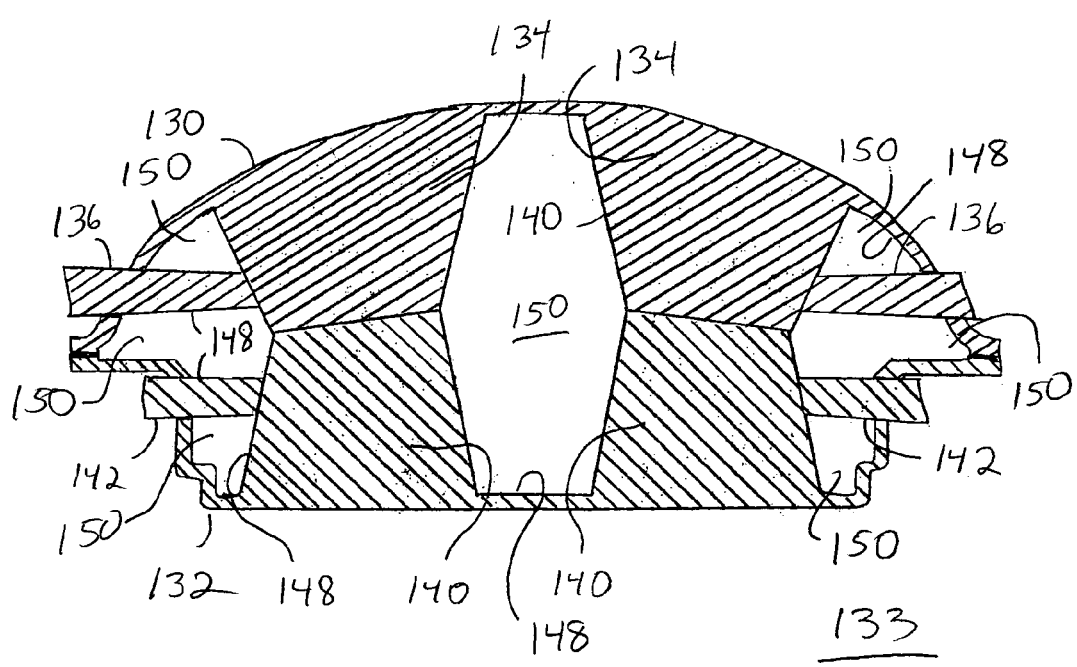
FIG. 7 shows a section view of the first and second mold sections of FIG. 5 assembled to make the tank of FIG. 2.

Referring to FIGS. 6-7, FIG. 6 shows a section view of a first section 130 and second mold section 132 used in forming tank 22. FIG. 7 shows a section view of first and second mold sections 130 and 132, respectively, assembled to form a closed mold 133. First and second mold sections 130 and 132 are utilized in a rotational molding process according to a preferred embodiment of a method of making a hollowed walled structure.

First mold section 130 is shaped according to top wall 38 (FIG. 2) of shell 36 (FIG. 2). As such, first mold section 130 includes first protrusion sections 134 corresponding to portions of each of first and second baffles 48 and 50, respectively (FIG. 2). First mold section 130 further includes second support protrusions, or post protrusions 136 for abutting first protrusion sections 134. Post protrusions 136 are used to form first and third posts 84 and 92, respectively (FIG. 3). As shown, post protrusions 136 may be independently installable through openings 138 in first mold section 130.

Although not visible, first mold section 130 also includes exterior depressions, protuberances, and the like in accordance with the formation of indentations 110 (FIG. 2), openings 116 and 118, and receptacles 122, as known to those skilled in the art of mold making.

Second mold section 132 is shaped according to bottom wall 44 (FIG. 2) of shell 36. As such, second mold section 132 includes second protrusion sections 140 corresponding also to portions of each of first and second baffles 48 and 50. Second mold section 132 also includes second support protrusions, or post protrusions 142 for abutting second protrusion sections 140. Post protrusions 142 are used to form second and fourth posts 88 and 96, respectively (FIG. 3). As shown post protrusions 142 may be independently installable through openings 144 in second mold section 132.

In accordance with standard rotational molding methodologies, first and second protrusion sections 134 and 140, respectively, as well as post protrusions 136 and 142 are tapered. More particularly, elements 134, 136, 140, and 142 narrow as they extend toward a center of their respective first and second mold sections 130 and 132. This is done to facilitate mold removal following a rotational molding process.

Second mold section 132 is assembled with first mold section 130 to form closed mold 133 having a molding surface 148 and an interior cavity 150. When first and second mold sections 130 and 132 are assembled, second protrusion sections 140 abut first protrusion sections 134. In addition, installation of post protrusions 136 and 142 results in their abutment with respective first and second protrusion sections 134 and 140 in closed mold 133. Closed mold 133 is thus utilized to form a rotationally molded tank 22.

It should be recalled that tank 22 is largely hollow with first and second baffles 48 and 50, respectively (FIG. 2) and posts 83 (FIG. 2) disposed therein. Accordingly, closed mold 133 does not have multiple isolated chambers. Rather, all the chambers combine to form one interior cavity 150 of closed mold 133 so as to yield interior compartment 46 (FIG. 1).

A method of rotationally molding a hollow walled structure, such as tank 22, calls for providing and assembling first and second mold sections 130 and 132, respectively to form closed mold 133. As well known to those skilled in the art, closed mold 133 may then be installed into a molding machine. A pre-measured amount of thermoplastic material, in liquid or powder form, is placed in interior cavity 150 of closed mold 133.

The molding machine then indexes the closed mold 133 in an oven (not shown) where closed mold 133 and, subsequently the thermoplastic material, is brought up to the molding temperature. As closed mold 133 is heated, it is rotated continuously about its vertical and horizontal axes.

During the heating cycle, the thermoplastic material begins to stick to the hot molding surface 148. A skin is formed. This skin gradually forms a homogenous layer of thermoplastic material. Closed mold 133 continues to rotate within the oven until all of the thermoplastic material has been picked up by the hot molding surface 148.

While continuing to rotate, the molding machine moves closed mold 133 out of the oven and into a cooling chamber (not shown). Air, or a mixture of air and water, cools closed mold 133 and the layer of molten thermoplastic material. This cooling process continues until the part, i.e., tank 22, has cooled sufficiently to retain its shape. The molding machine then indexes closed mold 133 to a loading and unloading station (not shown) where closed mold 133 is opened and tank 22 is removed. Opening closed mold 133 first entails removal of post protrusions 136 and 142, followed by subsequent separation of first and second mold sections 130 and 132, respectively. A new batch of thermoplastic material can then be placed in interior cavity 150, first and second mold sections 130 and 132 are assembled, and the process is repeated.

In a preferred embodiment, tank 22 is at least two hundred gallons, and preferably, much larger. Accordingly, such a large tank, for example in excess of three feet long, requires a large mold. As mold size increases, and with the inclusion of protrusion sections for baffles and posts, interior portions of closed mold 133 may not heat uniformly. Consequently, some portions of closed mold 133 may not receive a sufficiently thick coating of thermoplastic material. Such a situation could compromise the structural integrity of tank 22.

Accordingly, the rotational molding methodology of the present invention may entail one or more additional operations to ensure a more uniform distribution of thermoplastic material on molding surface 148 of closed mold 133. One additional operation is to preheat an interior passage of ones of first and second protrusion sections 134 and 140, respectively, and/or preheat an interior passage of ones of post protrusions 136 and 142. Typically, such protrusions in a mold are hollow for materials cost and weight savings. Heating elements may be installed, or hot air may be blown, into these interior passages so as to cause protrusion sections 134 and 140 and post protrusions 136 and 142 to heat up ahead of the outer surfaces of closed mold 133.

Protrusion sections 134 and 140 and post protrusions 136 and 142 may be heated with closed mold 133 rotating about at least one axis. Consequently, protrusion sections 134 and 140 and post protrusions 136 and 142 can be partially molded prior to putting closed mold 133 into the oven (not shown) to have tank 22 molded in its entirety. Such a process may assure sufficient adhesion of the thermoplastic material onto the entirety of molding surface 148.

Closed mold 133 may optionally be filled with an excess volume of the thermoplastic material prior to preheating. An excess volume of the thermoplastic material may be, for example, approximately twenty-five percent more than a predetermined required amount. Once a layer of thermoplastic material of sufficient thickness has adhered to protrusion sections 134 and 140 and post protrusions 136 and 142, an excess remaining volume of the thermoplastic material, i.e., that which didn't adhere to any of molding surface 148 of protrusion sections 134 and 140 and post protrusions 136 and 142, may subsequently be removed from closed mold 133 prior to molding the rest of tank 22. The inclusion of an excess amount of material may facilitate the adhesion of an adequate mount of thermoplastic material on protrusion sections 134 and 140 and post protrusions 136 and 142.

Another additional operation is to deliver additional heat, as described above, to the interior passages of protrusions 134, 136, 140, and 142 during the actual heating cycle, again with the intent being to assure sufficient adhesion of the thermoplastic material onto the entirety of molding surface 148.

The previous discussion was largely directed toward a hollow walled structure and a method of rotationally molding the structure. In the embodiment of liquid transport apparatus 20 (FIG. 1), the hollow walled structure may be utilized for transporting liquid 34 (FIG. 1). In such a capacity, further optional features may be included as described in connection with the following figures.

Figure 8:
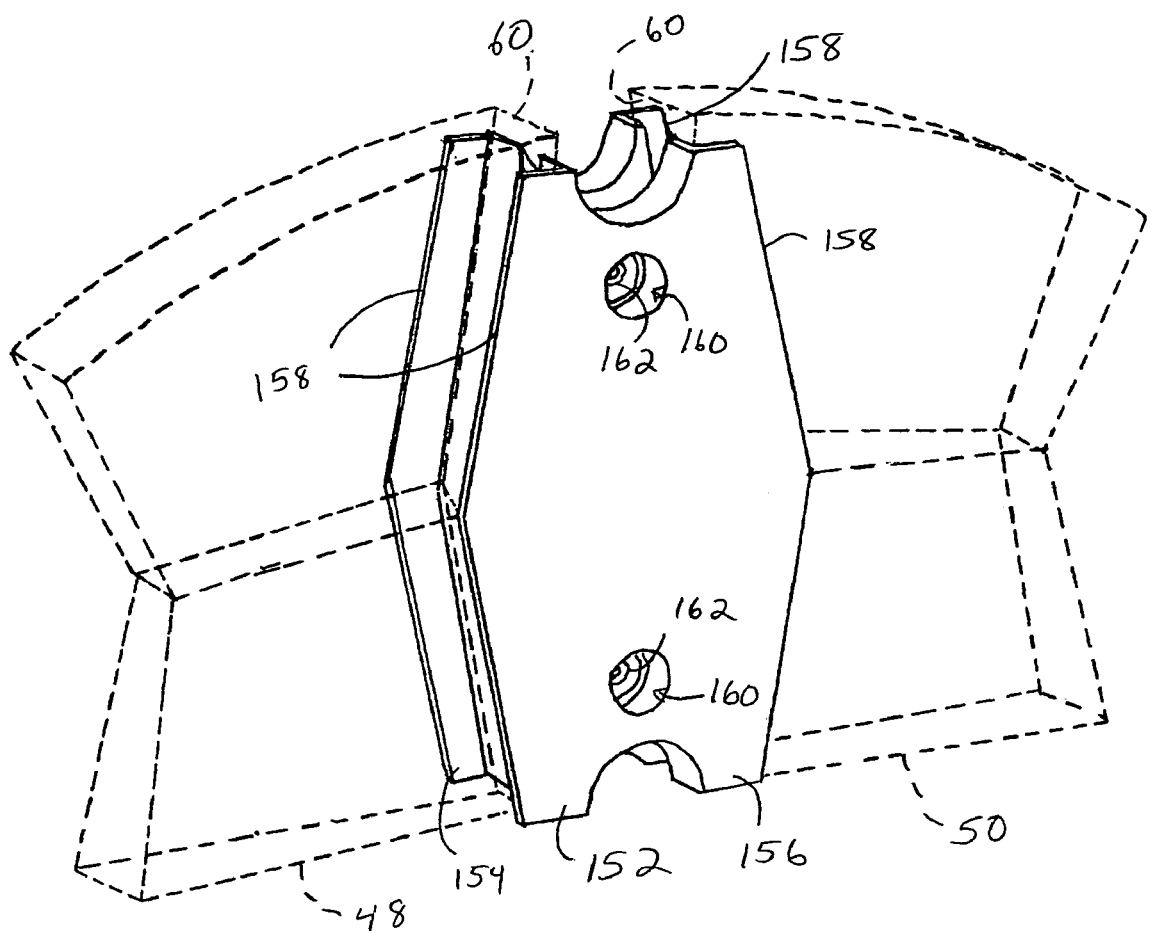
FIG. 8 shows a perspective view of an installable baffle that may be disposed within the interior compartment of the tank of the liquid transport apparatus.

Referring to FIGS. 1 and 8, FIG. 8 shows a perspective view of a third baffle 152 that may be disposed within interior compartment 46 of tank 22 of liquid transport apparatus 20. Third baffle 152 is interposed between first and second baffles 48 and 50, respectively, to further control the flow of liquid 34 in tank 22. The inclusion of third baffle 152 in combination with first and second baffles 48 and 50, respectively, can reduce the area of flow between the forward and aft ends of tank 22 by approximately ninety percent.

Third baffle 152 includes a first baffle section 154 and a second baffle section 156. Each of first and second baffle sections 154 and 156, respectively, includes angled longitudinal edges 158. As illustrated, edges 158 are configured to engage with side walls 60 of each of first and second baffles 48 and 50. In particular, side walls 60 are sandwiched between angled longitudinal edges 158. Channels 160 are provided into which fasteners 162 may be installed thereby fastening first and second baffle sections 154 and 156 to one another.

First and second baffle sections 154 and 156 of third baffle 152 largely block access to the forward end of tank 22. Consequently, a worker who is attempting to service interior compartment 46 via opening 116 would be unable to reach the front of tank 22 when third baffle 152 is in place. Accordingly, when servicing is required, fasteners 162 are removed so that first and second baffle sections 154 and 156 can be readily disengaged from side walls 60 of first and second baffles 48 and 50. Following servicing, first and second baffle sections 154 and 156 can then be readily reinstalled.

Figure 9:
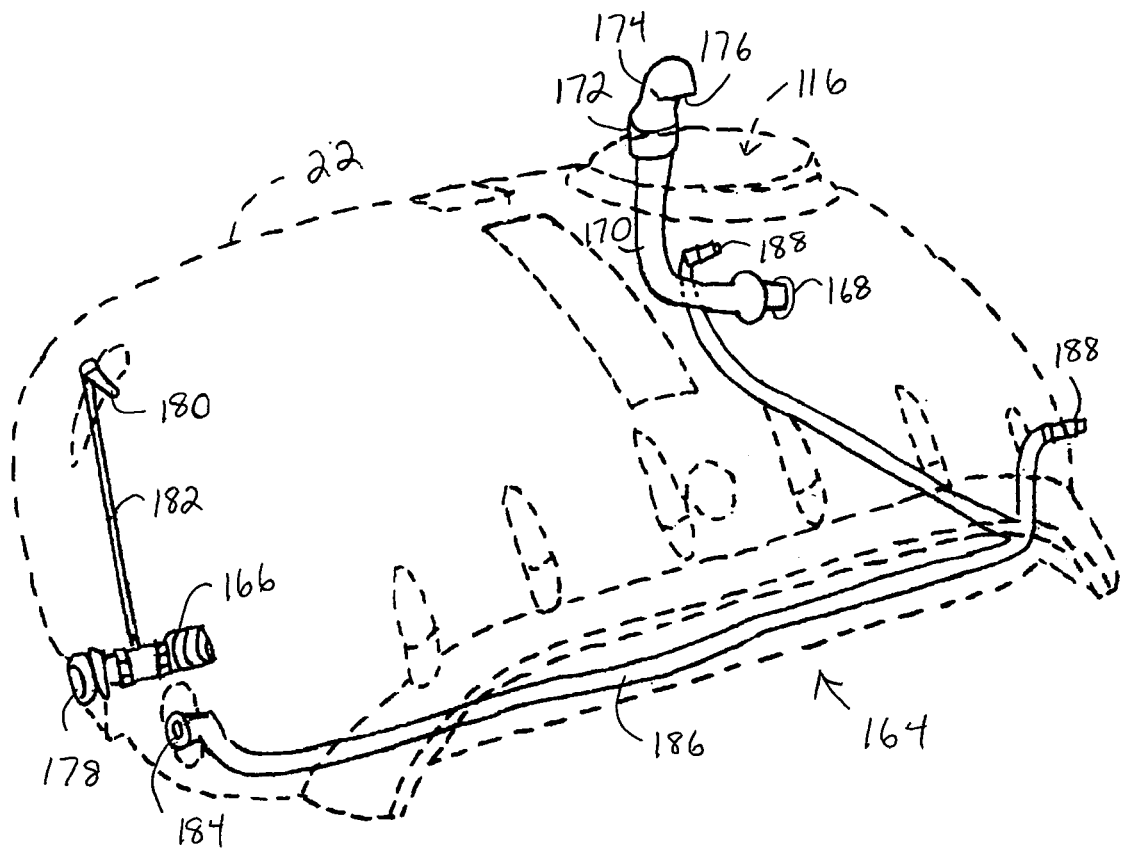
FIG. 9 shows a perspective view of a plumbing scheme installable into the interior compartment of the tank of the liquid transport apparatus.
Figure 10:
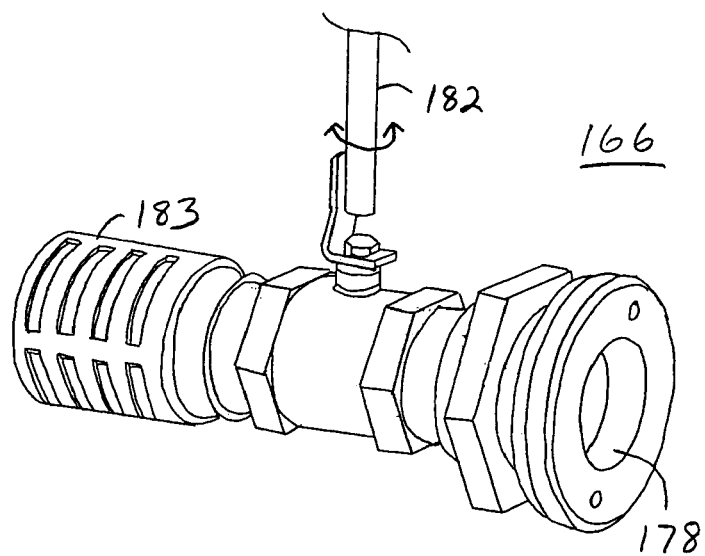
FIG. 10 shows a perspective view of an externally actuated valve of the plumbing scheme of FIG. 9.

Referring to FIGS. 9-10 in connection with FIG. 1, FIG. 9 shows a perspective view of a plumbing scheme 164 installable into interior compartment 46 of tank 22 (shown in ghost form) of liquid transport apparatus 20, and FIG. 10 shows a perspective view of an externally actuated valve 166 of plumbing scheme 164.

Plumbing scheme 164 incorporates several features that facilitate the use of apparatus 20 for storing, transporting, and dispensing liquid 34. Obviously, if liquid 34 is to be carried in tank 22, tank 22 must have an inlet port for entry of liquid 34. In this embodiment, tank 22 is filled via opening 116. To facilitate this liquid loading configuration, plumbing scheme 164 includes an inlet port 168 at the rear of tank 22. Tubing, in the form of a hose 170, is routed from inlet port 168 through interior compartment 46 and terminates at an outlet port 172 proximate opening 116. A hydrant 174 is coupled to outlet port 172 with its spout 176 suspended over opening 116. Routing hose 170 through interior compartment 46 yields a more aesthetically pleasing apparatus, and concomitantly protects hose 170 from mechanical damage, such as punctures, slashes, and the like. In addition, the internally routed hose 170 is protected from the degrading effect of the sun in warm climates, and is protected from freezing in cold climates.

When tank 22 is to be filled, a source hose (not shown) is coupled to inlet port 168 and liquid 34 is input into hose 170 through inlet port 168. Liquid 34, for example water, is subsequently discharged from hydrant 174 into opening 116. Opening 116 is significantly larger than spout 176 so that air displaced from tank 22 can readily escape as tank 22 is filled. In addition, many municipalities require that at least a two inch air gap be present between the discharge of liquid 34 from spout 176 and opening 116. This air gap is required so that should the water source pressure drop, liquid 34 could not be sucked out of tank 22 and into the water source system where it could contaminate the source water.

Plumbing scheme 164 further includes an outlet port 178 for routing liquid 34 to pump system 32 (FIG. 1). Valve 166 is disposed in interior compartment 46 (FIG. 1) of tank 22 and is in fluid communication with outlet port 178. A valve actuator 180, in the form of a rotating handle, is positioned external to tank 22 and is coupled to valve 166 via an internally routed rod member 182. A user can selectively open valve 166 by rotating valve actuator 180, thus rotating rod member 182, to enable liquid 34 to be routed through pump system 32. Valve 166 may be any of a number of types of valves known to those skilled in the art for enabling or disabling flow of liquid 34 from outlet port 178. Positioning valve 166 in interior compartment 46 again yields a more aesthetically pleasing apparatus while protecting valve 166 from freezing in cold climates. In addition, a filter 183 may be secured to an inlet of valve 166 to prevent particulates from reaching pump system 32.

Liquid 34 enters pump system 32 via outlet port 178, and is routed under pressure from pump system 32 into an inlet port 184 into tank 22. Inlet port 184 is coupled to liquid tubing 186 disposed in interior compartment 46 of tank 22. Liquid tubing 186 branches to couple to each of a pair of outlet nozzles 188. Outlet nozzles 188 may be ball and socket type nozzles for spraying liquid 34 from tank 22. Like hose 170, the routing of tubing 186 through interior compartment 46 yields a more aesthetically pleasing apparatus, and protects tubing 186 from mechanical damage, from the degrading effect of the sun in warm climates, and from freezing in cold climates.

Figure 11:
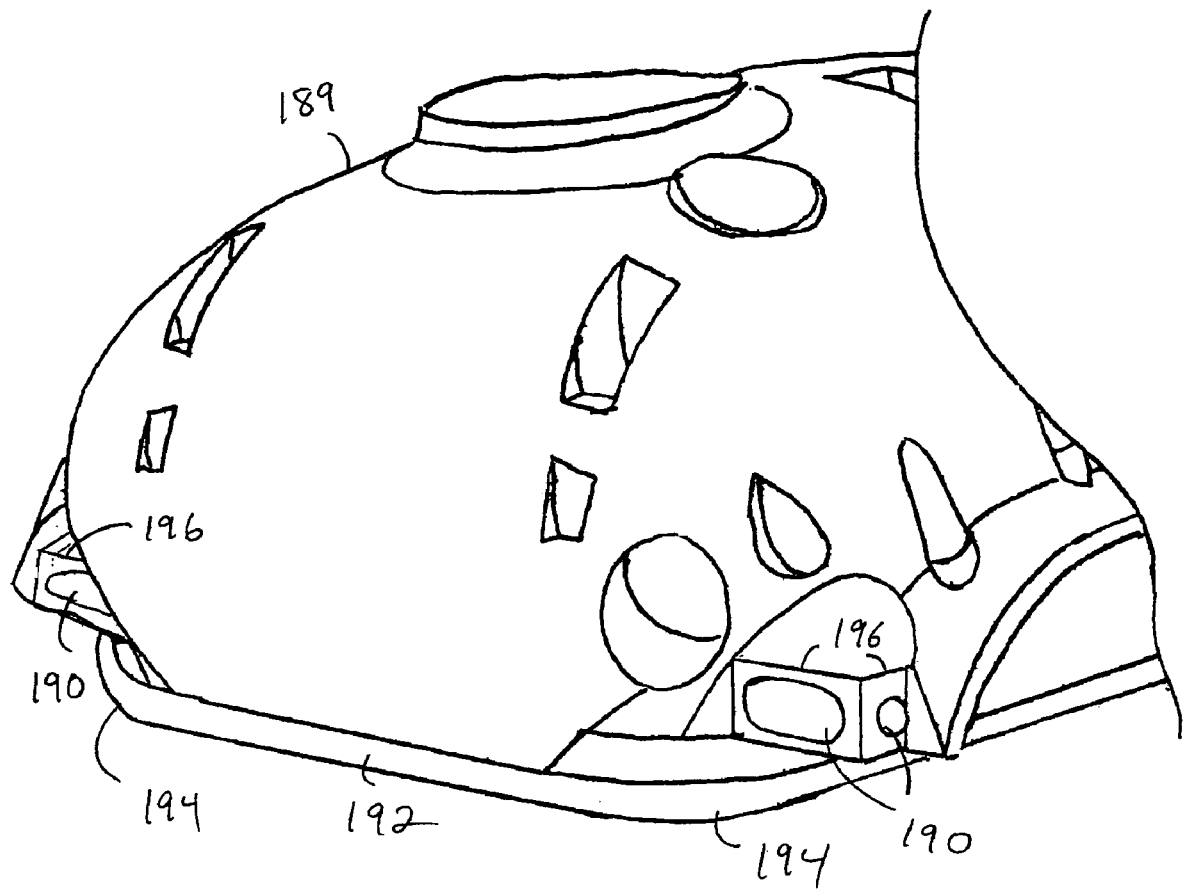
FIG. 11 shows a partial perspective view of the tank of the liquid transport apparatus to which a taillight is attached.

Referring to FIG. 11 in connection with FIG. 1, FIG. 11 shows a partial perspective view of a tank 189 of liquid transport apparatus 20 to which taillights 190 are attached. In one embodiment of the present invention, a frame 192 of apparatus 20 includes arcuate, or curved, rear corners 194. Arcuate corners 194 lend a streamlined look to apparatus 20. More importantly, however, due to their shape, arcuate corners 194 do not extend outwardly from apparatus 20 as do corners of the conventional squared frame 24. Consequently, individuals walking near apparatus 20 are less likely to bump into arcuate corners 194 than the conventional squared frame 24 utilized on apparatus 20 in FIG. 1. Additionally, when apparatus 20 is being backed into place, arcuate corners 194 are less likely to collide with curbs, building edges, posts, and the like then the corners of frame 24.

Arcuate corners 194 of frame 192 exhibit a relatively large radius, for example, in excess of fifteen inches. Consequently, taillights 190 are positioned on tank 189, rather then on frame 192. In order to accommodate taillights 190, tank 189 includes planar portions 196. When tank 22 is installed onto frame 192, planar portions 196 are located on outer rear edges of tank 22 proximate arcuate corners 194 of frame 192. Taillights 190 are subsequently mounted to planar portions 196 during post-molding assembly of apparatus 20.

Figure 12:
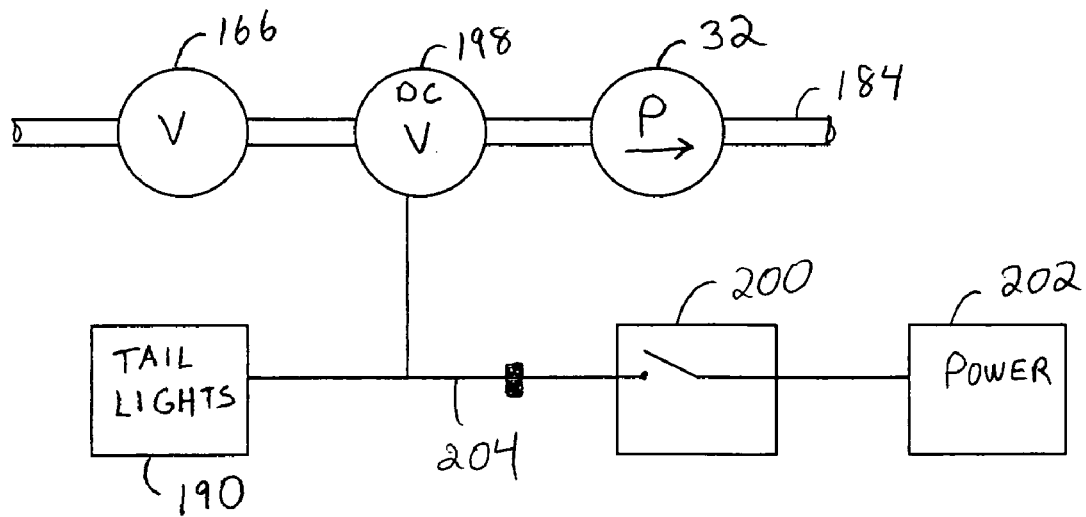
FIG. 12 shows a block diagram of a wiring scheme for powering an electrically actuated valve in accordance with another embodiment of the present invention.

Referring to FIG. 12 in connection with FIG. 1, FIG. 12 shows a block diagram of a wiring scheme for powering an electrically actuated valve 198 in accordance with another embodiment of the present invention. As mentioned previously, apparatus 20 is configured for attachment to a towing vehicle (not shown). In the valve embodiment shown in FIGS. 9-10, valve 166, disposed in interior compartment 46 of tank 22, is manually actuated at valve actuator 186, i.e., a handle, (FIG. 9) positioned on the outer surface of tank 22.

Operation of liquid transport apparatus 20 thus calls for an operator activating pump system 32 (FIG. 1), and then manually opening valve 166. These operations will cause liquid 34 to immediately be dispensed from nozzles 188. When apparatus 20 is to be towed behind a towing vehicle, the operator then gets into the vehicle and drives a prescribed route to dispense liquid 34 from apparatus 20. An inconvenience of a manually actuated valve, such as valve 166, is that while apparatus 20 remains stationary, an undesirably large amount of liquid 34 may be dispensed at a single location. This large amount of liquid 34 can puddle thus creating a mess as well as possible environmental damage. Furthermore, a large amount of liquid 34 can be wasted at this single location.

In the embodiment of FIG. 12, electrically actuated valve 198 is coupled in series with valve 166 and is in fluid communication with outlet port 178 (FIG. 9). Electrically actuated valve 198 can be selectively opened and closed via a remote switch to enable the flow of liquid 34 to pump system 32 at a desired point in time.

Per convention, a wiring harness is provided that interconnects taillights 190 of apparatus 20 with the towing vehicle's electrical system. Thus, taillights 190 can be illuminated utilizing a light switch 200 typically mounted on the vehicle's instrument panel that is interconnected through the vehicle's power distribution system (not shown) to the vehicle battery 202. In the embodiment of FIG. 12, a modified wiring harness 204 electrically couples both taillights 190 and electrically actuated valve 198 in parallel with light switch 200. Consequently, when light switch 200 is actuated to illuminate taillights 190, valve 198 will also be actuated to an open position.

Operation of liquid transport apparatus 20 having electrically actuated valve 198 in addition to valve 166 calls for an operator activating pump system 32 (FIG. 1), and then manually opening valve 166. When light switch 200 is open, i.e., taillights 190 are off, these operations, while readying the system, will not cause liquid 34 to be dispensed from nozzles 188. Rather, the operator then gets into the vehicle and opens valve 198, at a desired point in time, by actuating light switch 200. Actuation of light switch 200 will cause taillights 190 to illuminate and cause valve 198 to open thus initiating the dispensing of liquid 34 from nozzles 188 (FIG. 9). This delayed opening of valve 198 prevents the problems of puddling and wasted liquid 34 while apparatus 20 is still stationary.

When taillights 190 are illuminated for navigational purposes, electrically actuated valve 198 is also open, as discussed above. Consequently, valve 166 and electrically actuated valve 198 are provided in series so that valve 166, in the closed position, prevents inadvertent leakage of liquid 34 from tank apparatus 20 even when valve 198 is open. Actuation of valve 198 is tied in parallel with illumination of taillights 190 via wiring harness 204 for simplicity of design and low cost of manufacture. However, it should be understood, that valve 198 could have a switching system that is independent from light switch 200. If valve 198 has a switching system that is independent from light switch 200, liquid transport apparatus need not include the mechanically actuated valve, i.e., valve 166.

In summary, the present invention teaches of a hollow walled structure that can withstand forces imposed on it by a material carried within the structure. The hollow walled structure, in the form of tank, includes vertically oriented supporting baffles that limit movement of a liquid carried within the structure, while providing structural strength to the tank. Posts are disposed within the interior compartment of the tank and extend from the wall of the tank to intersect with the baffles. The posts further increase the structural integrity of the tank by limiting the potential for outward bulging of the tank due to the material carried within it. The tank, including the baffles and posts, is simply and cost-effectively manufactured utilizing a rotational molding process to concurrently form a shell of the tank, the baffles, and the posts. The rotational molding process entails operations of pre-heating interior portions of the mold, delivery of heat to those interior portions of the mold during the heating process, and/or the introduction of an excess quantity of thermoplastic material when loading the mold with the intent being to assure sufficient adhesion of the thermoplastic material onto the entirety of molding surface.

Although the preferred embodiments of the invention have been illustrated and described in detail, it will be readily apparent to those skilled in the art that various modifications may be made therein without departing from the spirit of the invention or from the scope of the appended claims. For example, the hollow walled structure may be formed into numerous shapes and sizes and may include any number of baffles and posts.

What is claimed is:

1. A hollow walled structure for holding a liquid comprising:
    a shell defining an interior compartment;
    a first support disposed within said interior compartment and engaging said shell at a first location on said shell and a second location on said shell, said first support including side walls, a front wall, and a rear wall, said side walls being interconnected with said front wall and said rear wall to form a duct extending through said interior compartment, said duct having a first opening through said shell at said first location on said shell and having a second opening through said shell at said second location on said shell; and
    a second support engaging said shell at a third location on said shell and extending through said interior compartment to intersect said first support.

2. A structure as claimed in claim 1 wherein said shell comprises:
    a top surface elongated in a longitudinal direction and having an arced cross-section transverse to said longitudinal direction;
    a generally flat bottom surface elongated in said longitudinal direction and arranged to close said arced cross-section of said top surface.

3. A structure as claimed in claim 1 wherein said second support is a tubular member having a third opening through said shell at said third location on said shell, and having a fourth opening through said duct of said first support.

4. A structure as claimed in claim 1 wherein said first support is oriented substantially vertically between said first and second locations.

5. A structure as claimed in claim 1 wherein:
    said shell exhibits a length dimension and a width dimension perpendicular to said length dimension; and said first support is a baffle exhibiting a width that is greater than a thickness, said baffle being oriented such that said width is substantially parallel to said width dimension of said shell.

6. A structure as claimed in claim 1 wherein:
said shell exhibits a length dimension; and
said second support exhibits a longitudinal axis, said second support being oriented in said interior compartment such that said longitudinal axis is approximately transverse to said length dimension of said shell.

7. A structure as claimed in claim 1 further comprising a third support disposed in said interior compartment and engaging said shell at a fourth location on said shell and a fifth location on said shell.

8. A structure as claimed in claim 7 further comprising a fourth support engaging said shell at a sixth location on said shell and extending through said interior compartment to intersect said third support.

9. A structure as claimed in claim 1 further comprising a third support engaging said shell at a fourth location on said shell and extending through said interior compartment to intersect said first support.

10. A structure as claimed in claim 1 further comprising parallel spaced indentations arranged along longitudinal sides of said shell.

11. A structure as claimed in claim 1 wherein said shell forms a tank for holding at least two hundred gallons of a liquid.

12. A hollow walled structure, said structure being configured for attachment to a wheeled trailer, and said structure comprising:
a shell defining an interior compartment;
a first support disposed within said interior compartment and engaging said shell at a first location on said shell and a second location on said shell;
a second support engaging said shell at a third location on said shell and extending through said interior compartment to intersect said first support;
a first fender extending from a first exterior side of said shell; and
a second fender extending from a second exterior side of said shell, said first and second fenders being configured to substantially cover wheels of said trailer.

13. A structure as claimed in claim 12 further comprising parallel spaced indentations arranged along longitudinal sides of said shell and extending through said first and second fenders.

14. A liquid transport apparatus comprising:
a tank including:
a shell defining an interior compartment;
a first support disposed within said interior compartment and engaging said shell at a first location on said shell and a second location on said shell, said first support including side walls, a front wall, and a rear wall, said side walls being interconnected with said front wall and said rear wall to form a duct extending through said interior compartment, said duct having a first opening through said shell at said first location on said shell and having a second opening through said shell at said second location on said shell; and
a second support engaging said shell at a third location on said shell and extending through said interior compartment to intersect said first support;
a frame supporting said tank; and
wheels rotationally coupled to said frame.

15. A liquid transport apparatus as claimed in claim 14 wherein said shell comprises:

a top surface elongated in a longitudinal direction and having an arced cross-section transverse to said longitudinal direction;
a generally flat bottom surface elongated in said longitudinal direction and arranged to close said arced cross-section of said top surface.

16. A liquid transport apparatus as claimed in claim 14 wherein said second support is a tubular member having a third opening through said shell at said third location on said shell, and having a fourth opening through said duct of said first support.

17. A liquid transport apparatus as claimed in claim 14 wherein:
said tank further comprises a third support, said third support exhibiting second side walls, a second front wall, and a second rear wall, said second side walls being interconnected with said second front wall and said second rear wall to form a second duct extending through said interior compartment, said second duct having a third opening through said shell at a fourth location on said shell and having a fourth opening through said shell at a fifth location on said shell; and
said apparatus further comprises a strap element directed through each of said duct and said second duct and about said frame to couple said tank to said frame.

18. A liquid transport apparatus as claimed in claim 14 wherein:
said shell exhibits a length dimension and a width dimension perpendicular to said length dimension; and
said first support is a baffle exhibiting a width that is greater than a thickness, said battle being oriented such that said width is substantially parallel to said width dimension of said shell.

19. A liquid transport apparatus as claimed in claim 14 wherein:
said shell exhibits a length dimension; and
said second support exhibits a longitudinal axis, said second support being oriented in said interior compartment such that said longitudinal axis is approximately transverse to said length dimension of said shell.

20. A liquid transport apparatus as claimed in claim 14 wherein said tank further comprises indentations arranged along longitudinal sides of said shell.

21. A liquid transport apparatus as claimed in claim 14 wherein:
said frame comprises arcuate rear corners;
said tank includes a planar portion positioned proximate each of said arcuate rear corners; and
said apparatus further comprises taillights mounted to said planar portion of said tank.

22. A liquid transport apparatus as claimed in claim 14 wherein:
said tank includes an inlet port and an outlet port extending through said wall of said shell; and
said apparatus further comprises a liquid tube disposed in said interior compartment for conveying a liquid between said inlet port and said outlet port.

23. A liquid transport apparatus comprising:
a tank including:
a shell defining an interior compartment;
a first baffle disposed within said interior compartment and engaging said shell at a first location on said shell and a second location on said shell; and a support engaging said shell at a third location on said shell and extending through said interior compartment to intersect said first support;

a second baffle disposed within said interior compartment and engaging said shell at fourth location on said shell and a fifth location on said shell, said second baffle being aligned with said first baffle; and a third baffle juxtaposed between said first and second baffles, said third baffle being removably engagable with one of said first and second baffles;

a frame supporting said tank; and wheels rotationally coupled to said frame.

24. A liquid transport apparatus comprising:

a tank including:

a shell defining an interior compartment;

a first support disposed within said interior compartment and engaging said shell at a first location on said shell and a second location on said shell; and a second support engaging said shell at a third location on said shell and extending through said interior compartment to intersect said first support;

a frame supporting said tank;

wheels rotationally coupled to said frame;

a first fender extending from a first exterior side of said shell; and a second fender extending from a second exterior side of said shell, said first and second fenders substantially covering said wheels.

* * * * *